US011745738B2

(12) United States Patent
Roth

(10) Patent No.: US 11,745,738 B2
(45) Date of Patent: Sep. 5, 2023

(54) SYSTEM AND METHOD FOR CONTROLLING A PROPULSION SYSTEM INVERTER

(71) Applicant: DELPHI TECHNOLOGIES IP LIMITED, St. Michael (BB)

(72) Inventor: Gregory T. Roth, Davison, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 248 days.

(21) Appl. No.: 17/151,830

(22) Filed: Jan. 19, 2021

(65) Prior Publication Data
US 2022/0227368 A1 Jul. 21, 2022

(51) Int. Cl.
*B60W 30/14* (2006.01)
*B60L 15/20* (2006.01)
*B60W 10/08* (2006.01)

(52) U.S. Cl.
CPC ....... *B60W 30/143* (2013.01); *B60L 15/2045* (2013.01); *B60W 10/08* (2013.01); *B60L 2210/40* (2013.01); *B60L 2240/12* (2013.01); *B60L 2240/525* (2013.01); *B60W 2510/087* (2013.01)

(58) Field of Classification Search
CPC ............. B60L 15/2045; B60L 2210/40; B60L 2240/12; B60L 2240/525; B60L 3/003; B60W 30/143; B60W 10/08; B60W 2510/087; B60W 30/1843
See application file for complete search history.

(56) References Cited

U.S. PATENT DOCUMENTS

| 10,688,860 | B2 | 6/2020 | Diemunsch | |
| 2007/0070667 | A1 | 3/2007 | Stancu et al. | |
| 2016/0102622 | A1* | 4/2016 | Crombez | G01L 5/22 701/51 |
| 2017/0087994 | A1 | 3/2017 | Kakisako | |
| 2018/0126974 | A1 | 5/2018 | Seo et al. | |
| 2020/0274375 | A1 | 8/2020 | Griffiths et al. | |
| 2020/0376927 | A1 | 12/2020 | Rajaie et al. | |
| 2021/0394644 | A1* | 12/2021 | Langenderfer | B60K 11/02 |

FOREIGN PATENT DOCUMENTS

| KR | 101944253 B1 | 2/2019 |
| WO | 2020146969 A1 | 7/2020 |

OTHER PUBLICATIONS

Extended European Search Report dated May 30, 2022 for European Application No. 21213268.2, 12 pages.

* cited by examiner

*Primary Examiner* — Tyler J Lee
*Assistant Examiner* — Yufeng Zhang
(74) *Attorney, Agent, or Firm* — Dickinson Wright PLLC

(57) ABSTRACT

A method of controlling a propulsion system inverter includes identifying at least one route characteristic of a portion of a route being traversed by a vehicle. The method further includes Receiving at least one inverter characteristic. The method further includes generating a target thermal profile of the propulsion system inverter corresponding to thermal fatigue associated with the at least one thermal characteristic. The method further includes generating a signal to selectively instruct the adjustment of at least one of the vehicle speed control input, a torque demand corresponding to the vehicle speed control input, and the portion of the route based on the target thermal profile of the propulsion system inverter to improve inverter life.

20 Claims, 6 Drawing Sheets

SYSTEM AND METHOD FOR CONTROLLING A PROPULSION SYSTEM INVERTER

TECHNICAL FIELD

This disclosure relates to vehicle propulsion control, and in particular to systems and methods for improving an operational life of a propulsion system inverter.

BACKGROUND

Vehicles, such as cars, trucks, sport utility vehicles, cross-overs, mini-vans, or other suitable vehicles, may include various automatic vehicle propulsion control systems, such as cruise control, adaptive cruise control, and the like. Typically, such systems receive input from a driver that indicates a desired vehicle speed. The automatic vehicle propulsion control systems typically interact with various vehicle components, such as a throttle, brake system, propulsion system inverters, and the like, to achieve the desired speed.

Existing propulsion system inverter controls respond to driver desired torque commands based on driver input (e.g., an accelerator pedal or similar device) to convey driver intent. In some cases, a cruise control or adaptive cruise control or other similar system provides a surrogate for driver desired propulsion system torque. A vehicle propulsion controller then responds to and delivers this desired torque to produce the vehicle speed that the driver is expecting. This vehicle propulsion control scheme applies to hybrid and electric vehicles as well as internal combustion engine vehicles. However, the vehicle propulsion controller commands a desired level of torque that is generally irrespective of the thermal state of the propulsion inverter.

SUMMARY

This disclosure relates generally to vehicle propulsion control systems and methods.

An aspect of the disclosed embodiments includes a method of controlling a propulsion system inverter. The method includes identifying at least one route characteristic of a portion of a route being traversed by a vehicle. The method further includes receiving at least one inverter characteristic. The method further includes generating a target thermal profile of the propulsion system inverter corresponding to thermal fatigue associated with the at least one thermal characteristic. The method further includes generating a signal to selectively instruct the adjustment of at least one of the vehicle speed control input, a torque demand corresponding to the vehicle speed control input, and the portion of the route based on the target thermal profile of the propulsion system inverter.

Another aspect of the disclosed embodiments includes an apparatus for controlling a propulsion system inverter of a vehicle. The apparatus includes a memory and a processor. The memory includes instructions executable by the processor to: identify at least one route characteristic of a portion of a route being traversed by a vehicle; receive at least one inverter characteristic; generate a target thermal profile of the propulsion system inverter corresponding to thermal fatigue associated with the at least one inverter characteristic; and generate a signal to selectively instruct the adjustment of at least one of the vehicle speed control input, a torque demand corresponding to the vehicle speed control input, and the portion of the route based on the target thermal profile of the propulsion system inverter.

Another aspect of the disclosed embodiments includes a non-transitory computer-readable storage medium, comprises executable instructions that, when executed by a processor, facilitate performance of operations, comprising: identifying at least one route characteristic of a portion of a route being traversed by a vehicle; receiving at least one inverter characteristic; generating a target thermal profile of the propulsion system inverter corresponding to thermal fatigue associated with the at least one inverter characteristic; and generating a signal to selectively instruct the adjustment of at least one of the vehicle speed control input, a torque demand corresponding to the vehicle speed control input, and the portion of the route based on the target thermal profile of the propulsion system inverter.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
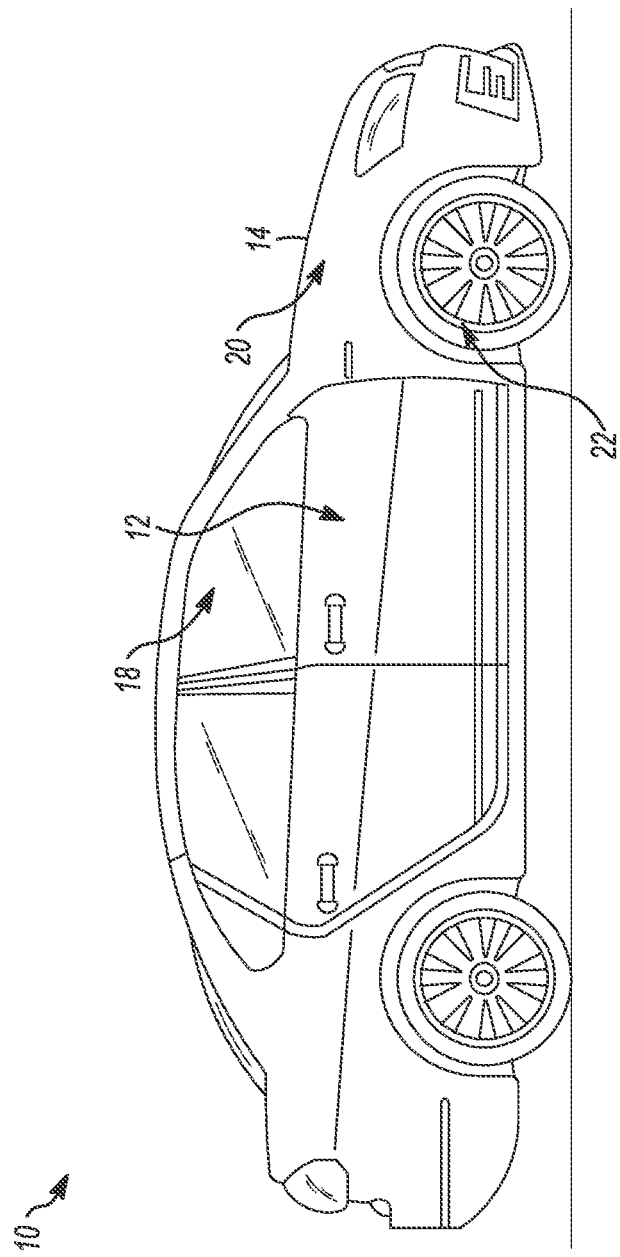
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, may include various automatic vehicle propulsion control systems that may provide a level of automation for the vehicle. For example, a vehicle may include cruise control, adaptive cruise control, automatic braking, a fully autonomous vehicle control system, or any suitable vehicle propulsion control system or a combination thereof. Typically, systems such as cruise control and adaptive cruise control receive input from a driver that indicates a desired vehicle speed. In the case of a fully autonomous vehicle, the autonomous vehicle control systems may determine a vehicle speed based on posted speed limits and a variety of safety systems and protocols. The automatic vehicle propulsion control systems typically interact with various vehicle components, such as a throttle, brake system, and the like, to achieve the desired speed.

While existing propulsion system inverter controls respond to driver desired torque commands based on driver input (e.g., an accelerator pedal or similar device) to convey driver intent, the resulting level of torque is generally irrespective of the thermal state of the propulsion inverter. In some cases, a cruise control or adaptive cruise control or other similar system provides a surrogate for driver desired propulsion system torque. A vehicle propulsion controller then responds to and delivers this desired torque to produce the vehicle speed that the driver is expecting. This vehicle propulsion control scheme applies to hybrid and electric vehicles as well as internal combustion engine vehicles.

Existing propulsion system inverter control is based on responding to driver desired torque commands based on driver input via the accelerator pedal or similar device to convey driver intent. In some cases, a cruise control or adaptive cruise control or other similar system provides a surrogate for driver desired propulsion system torque. The vehicle propulsion controller then responds to and delivers this desired torque to produce the vehicle speed that the driver is expecting. This control strategy applies to hybrid and electric vehicles as well as internal combustion engine vehicles. The propulsion control system commands a desired level of electric machine torque based on torque control and/or torque split algorithms and calibration, subject to propulsion system limits, irrespective of the thermal state of the propulsion system inverter.

The propulsion system inverter responds to such commands and delivers the desired level of current output to produce the desired torque, subject to overload limits and other protection features. Transient driver desired torque inputs result in corresponding transient inverter current outputs. This current is delivered through the power electronics components and their corresponding electrical connection features (solder, wire bonds, and the like). The power electronic components undergo resistive heating due to their fundamental electrical characteristics coupled with the electrical current flow (FR losses). This resistive heating creates differential thermal expansion within and between the components and connection features, thus creating thermal stress and thermal fatigue. Inverter life is negatively impacted by the number, rate, and severity of the thermal stress cycles.

Filtering the driver desired torque to reduce inverter thermal transients may make the vehicle less responsive and cause poor drivability. Propulsion system inverters, especially those used in large and heavy vehicles, are expensive to replace and their failure will lead to inconvenience, warranty cost, and lost productivity for commercial vehicles. Commercial vehicles are also expected to operate for many hundreds of thousands or millions of miles, making inverter life even more critical. Accordingly, prolonging inverter life has direct financial implications for the vehicle owner.

However, the vehicle propulsion controller commands a desired level of torque that is generally irrespective of the thermal state of the propulsion inverter. Accordingly, there is continued interest in accounting for the thermal state of the propulsion system inverter for vehicle propulsion controller commands to improve operational life and operational costs associated with the propulsion system inverter.

In some embodiments, the systems and methods described herein may be configured to utilize automated driving optimization techniques that include inverter life in the optimization objective. For example, the systems and methods described herein may be configured to generate an "Inverter Life Damage Cost" as a cost component in a vehicle drive cycle optimization algorithm such that the "Cost to Go" function includes the energy costs and time cost and also an inverter damage cost of the specific route segment operating alternatives.

In some embodiments, the systems and methods described herein may be configured to determine the inverter damage cost based on the level and rate of change of inverter output current (e.g., derived from the electric machine torque) to the adjacent route segment, along with the resulting thermal state of the inverter components based on heat transfer models of inverter power devices and cooling structures. For example, the systems and methods described herein may be configured to use one or more simplified heat transfer models that include the thermal mass of various components, heat input based on inverter current and conductive and convective heat transfer coefficients within the system.

In some embodiments, the systems and methods described herein may be configured to generate an optimal drive cycle and/or associated torque profile based on the minimum total costs (e.g., including inverter damage cost, with appropriate weighting). In some embodiments, units of cost may include be generic costs or specific costs (such as monetary, and the like). In some embodiments, the systems and methods described herein may be configured to identify known relationships between inverter life and the thermal transients of the critical components to establish the damage cost of the proposed operating conditions for the route segment.

In some embodiments, the systems and methods described herein may be configured to generate an optimized propulsion system torque profile that may be applied directly to an associated control system. In some embodiments, the systems and methods described herein may be configured to generate an optimum speed profile and to generate a torque recommendation that may be provided to the driver and, when followed (e.g., by the driver), may provide the optimized inverter life benefit along with energy and travel time optimization. In some embodiments, the systems and methods described herein may be configured to dictate a level of torque to be applied, such that the driver may perceive the system as responsive and with good drivability. In some embodiments, the systems and methods described herein may be configured to follow the planned vehicle speed trajectory and minimize the damaging transients to the propulsion system inverter.

In some embodiments, the systems and methods described herein may be configured to receive or otherwise determine upcoming route features and optimizing vehicle operation through the selected route. For example, the systems and methods described herein may be configured to determine the pre-planned vehicle speed and torque trajectories, using corresponding inverter currents, which may provide the opportunity of constructing a predictive thermal model of the inverter power electronics to generate a planned inverter thermal profile along the route. In some embodiments, the thermal profile may be used along with other techniques, such as Model Predictive Control.

In some embodiments, the systems and methods described herein may be configured to pre-plan the inverter cooling system control and/or pre-emptively schedule coolant flows and temperatures to further reduce inverter component thermal stress. In some embodiments, the systems and methods described herein may be configured to operate under a feedback-controlled or reactive system based on thermal states of the device or the coolant itself. For example, the systems and methods described herein may pre-cool or pre-heat the inverter in anticipation of the upcoming thermal transients, thereby minimizing thermal stress. Thermal time constants and thermal gradients in the cooling system may then be managed to provide optimal heat transfer from the device being cooled.

In some embodiments, the systems and methods described herein may be configured to provide the driver with recommended speed or torque limits based on the current states of the inverter component temperatures, the anticipated vehicle longitudinal dynamics, or a combination thereof based on vehicle velocity and upcoming route features along the most probable path.

In some embodiments, the systems and methods described herein may be configured to identify at least one route characteristic of a portion of a route being traversed by a vehicle. The systems and methods described herein may be configured to generate a target vehicle speed profile for traversing the portion of the route. The systems and methods described herein may be configured to selectively adjust a vehicle speed control input based on the target vehicle speed profile. The systems and methods described herein may be configured to generate a target thermal profile of the propulsion system inverter corresponding to thermal fatigue. The systems and methods described herein may be configured to generate a signal to selectively instruct the adjustment of at least one of the vehicle speed control input, a torque demand corresponding to the vehicle speed control input, and the portion of the route based on the target thermal profile of the propulsion system inverter.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 may be disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a propulsion system inverter, a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a propulsion system inverter, a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system, such as the propulsion system inverter and related components to translate driver input into a torque output.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. The vehicle 10 may include one or more electrical energy storage and supply systems, such as a battery, ultra-capacitor, flywheel system, fuel cell, or combinations thereof, and provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
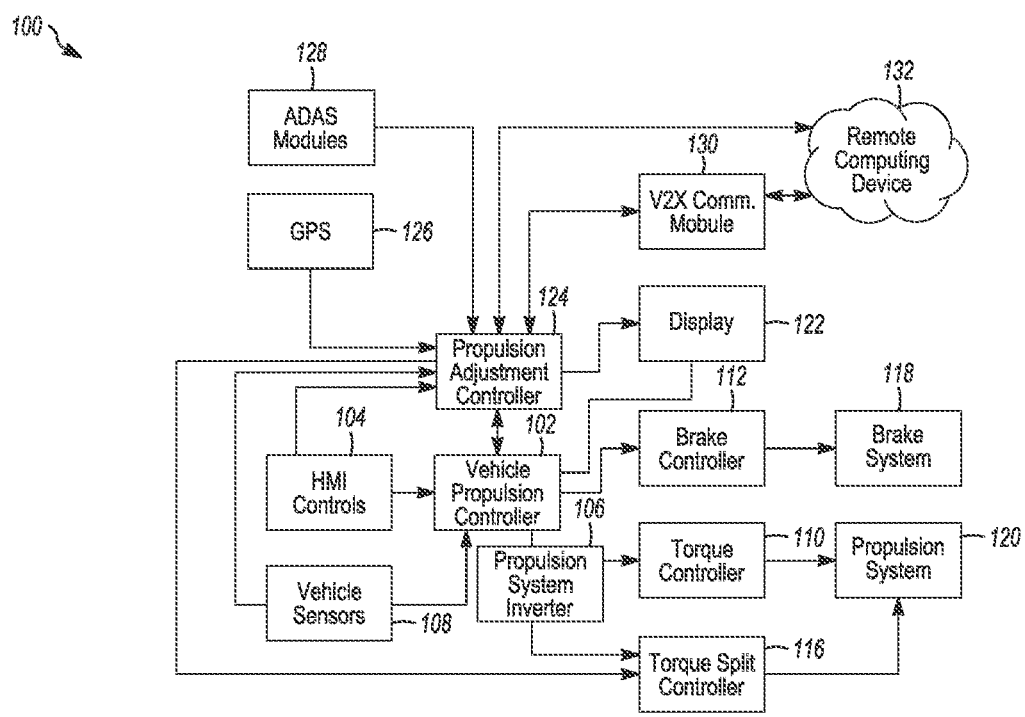
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, propulsion system inverter 106 information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the driver. The mobile computing device may include a smart phone, tablet, laptop computer, or other suitable mobile computing device. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing devices. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. Inputs through the automatic vehicle propulsion system and a manually controlled propulsion system may both be translated through a propulsion system inverter 106. It should be understood that, while only limited components of the system 100 are illustrated, the system 100 may include additional autonomous components or other suitable components.

The VPC 102 is in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the driver of the vehicle 10 may interface with the HMI controls 104 to use the VPC 102 to control vehicle propulsion and/or other features of the VPC 102. For example, the driver may actuate an HMI switch of the HMI controls 104 disposed on the steering wheel of the vehicle 10. The HMI controls 104 may communicate a signal to the VPC 102. The signal may indicate a desired vehicle speed selected by the driver. The VPC 102 generates a torque demand through the propulsion system inverter 106 that corresponds to the desired vehicle speed and communicates the torque demand to a torque controller 110 via a current output. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The driver may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, gradient sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse a gradient such as an incline that causes the vehicle 10 to reduce current vehicle speed (e.g., because the torque demand applied by the torque controller 110 is insufficient to maintain vehicle speed while on the incline). The VPC 102 may increase the torque demand in order adjust the current vehicle speed, thereby achieving the desired vehicle speed. In addition, the VPC 102 may adjust the torque demand in accordance with a target thermal profile of the propulsion system inverter 106 corresponding to thermal fatigue. For example, the VPC 102 may decrease a torque demand or alter a torque split to reduce thermal fatigue to the propulsion system inverter 106. In some embodiments, the target thermal profile may include a temperature of at least one component of the propulsion system inverter as measured against a time schedule of the propulsion system inverter.

In some embodiments, such as when the VPC 102 includes an adaptive cruise control mechanism, the VPC 102 may adjust the torque demand based at least one of an energy consumption target and a thermal profile of the propulsion system inverter 106 corresponding to thermal fatigue targets. For example, the VPC 102 may receive information from the vehicle sensors 108 indicating the presence of a gradient along a segment of the route. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed to meet the thermal profile. For example, the driver may indicate, using the HMI controls 104, to maintain a pace that meets an energy and thermal profile. The VPC 102 may selectively increase or decrease the torque demand to meet the thermal profile of the propulsion system inverter 106. The VPC 102 may bring the vehicle 10 to a slower or faster speed to meet the thermal profile of the propulsion system inverter 106. For example, the VPC 102 may be in communication with the torque controller 110 or torque split controller 116 to send a plurality of signals over a period indicating to the torque controller 110 or torque split controller 116 to control vehicle speed. In some embodiments, the propulsion system inverter 106 is a component of at least one of the VPC 102, the torque controller 110, and the torque split controller, or combinations therefore, or as a standalone component.

The brake controller 112 may be in communication with the brake system 118. The brake system 118 may include a plurality of brake components that are actuated in response to the brake controller 112 implementing braking procedures based on the plurality of signals from the VPC 102. In some embodiments, the VPC 102 may implement regenerative braking through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control, the driver indicates to resume vehicle propulsion control using the HMI controls 104 (e.g., the VPC 102 is not configured to resume vehicle propulsion control without interaction from the driver). In some embodiments, the vehicle 10 may include a higher level of automation including a higher level of propulsion control, as described, and may include suitable controls for bringing the vehicle 10 to a complete stop without interaction with the driver of the vehicle 10.

In some embodiments, the VPC 102 may determine a torque split in order to utilize an internal combustion engine and an electric motor of the vehicle 10 (e.g., in the case where the vehicle 10 is a hybrid vehicle). It should be understood that while only an internal combustion engine and an electric motor are described, the vehicle 10 may include any hybrid combination of any suitable vehicle engines and motors. The torque split indicates a portion of the torque demand to be applied to the internal combustion engine and a portion of the torque demand to be applied to the electric motor. For example, the electric motor may be used for vehicle propulsion when the torque demand is below a threshold. However, when the torque demand is above the threshold (e.g., such as the case when the vehicle 10 is on a gradient such as a steep incline) the internal combustion engine may provide at least a portion of vehicle propulsion in order to assist the electric motor. The VPC 102 communicates the torque split to the torque split controller 116. The torque split controller 116 is in communication with the propulsion system 120 to apply the torque split. In some embodiments, the propulsion system inverter 106 may include a first propulsion system inverter associated with the electric motor and a second propulsion system inverter associated with the combustion engine. As such, in some embodiments, the torque split controller 116 may receive instructions to utilize one or both the propulsion system inverters 106 to meet one or more target thermal profiles. In some embodiments, the propulsion system inverter 106 may be associated with both the combustion engine and an electric motor. As such, the torque split controller 116 may receive instructions to apply a certain split of torque demand in accordance with the target thermal profile to minimize, increase, or equally distribute torque demand along one or more pathways or contacts between the propulsion system inverter 106, the combustion engine, and the electric motor.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop. In some embodiments, the VPC 102 may determine whether to apply the desired vehicle speed set by the driver using the HMI controls 104 based on the signal from the safety controls. For example, the driver may increase the desired vehicle speed which may bring the vehicle 10 closer to the lead vehicle (e.g., the vehicle 10 may travel faster than the lead vehicle if the desired vehicle speed were achieved). The VPC 102 may determine not to apply the desired vehicle speed, and instead may provide an indication to the display 122 indicating to the driver that increasing the desired vehicle speed may be unsafe or the VPC 102 may ignore the increase in the desired vehicle speed. In some embodiments, the VPC 102 may be in communication with a transmission controller module (TCM). The VPC 102 may receive information from the TCM (e.g., an automatically selected gear) and may determine and/or adjust the total torque demand based on the information received from the TCM. In some embodiments, the safety control may determine to change a vehicle speed in a manner that decreases fuel efficiency to improve safety in view of route or traffic characteristics. In some embodiments, the safety control may monitor a thermal fatigue state of the propulsion system inverter 106 and generate a signal once the thermal fatigue state reaches a threshold limit. The signal may include instructions to the operator to reduce the vehicle speed or schedule maintenance of the propulsion system inverter 106. The signal may also include instructions to the VPC 102 to automatically reduce the vehicle speed. For example, the threshold limit of the thermal fatigue state may correspond to a temperature or thermal fatigue that indicates failure.

As described, the system 100 includes a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine and/or modify the profile for the target vehicle speed based on a target thermal profile of the propulsion system inverter corresponding to thermal fatigue. In some embodiments, the PAC 124 may determine the profile for the target vehicle speed based on a profile of the energy consumption efficiency corresponding to an optimum energy consumption of the vehicle 10 for various route characteristics, such as road grades, curvatures, traffic, speed limits, stop signs, traffic signals, other route characteristics, or a combination thereof.

The PAC 124 receives route characteristics (e.g., road gradient characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module disposed within the vehicle 10 (e.g., within the system 100) or may be disposed on a remote computing device, such as the remote computing device 132. When the mapping characteristics module is disposed on the remote computing device 132, the GPS antenna 126 may capture various global positioning signals from various global positioning satellites or other mechanisms. The GPS antenna 126 may communicate the captured signals to the mapping characteristics module. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126. In some embodiments, the PAC 124 may receive information about changes in gradients over segments of the route. In some embodiments, the information about changes in gradients over segments of the route may include distinguishing a negative gradient from a positive gradient, identifying a magnitude of the gradient, a length of the gradient, and a rate of change of the gradient.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a thermal sensor in the propulsion system inverter 106, a current output sensor of the propulsion system inverter 106, a weight sensor, other suitable sensors, or a combination thereof. The thermal sensor may be a physical sensor, an estimation sensor, a virtual sensor, or a combination thereof. The PAC 124 may receive an energy level (fuel level, battery charge, etc.) of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the driver of the vehicle 10 to improve vehicle safety, road safety, energy conservation, and thermal fatigue reduction of the propulsion system inverter 106. The ADAS modules 128 may be configured to automate and/or adapt and enhance vehicle systems for safety, more efficient driving, and thermal fatigue reduction of the propulsion system inverter 106. The ADAS modules 128 may be configured to generate a signal to alert the driver of the vehicle 10 of upcoming traffic conditions or disabled vehicles and/or to alert the vehicle 10 of a vehicle proximate to the vehicle 10 in order to avoid collisions and accidents.

In some embodiments, the ADAS modules 128 may be configured to generate a signal to selectively instruct the adjustment of at least one of a the vehicle speed control input, a torque demand corresponding to the vehicle speed control input, and the portion of the route based on the target thermal profile of the propulsion system inverter. Further, the ADAS modules 128 may autonomously avoid collisions by implementing safeguards and taking over control of the vehicle 10, such as, by automatic lighting, initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128. The ADAS modules 128 may initiate an adaptive cruise control with a target speed or torque split based on a target thermal profile of the propulsion system inverter corresponding to thermal fatigue.

The PAC 124 may receive, at least, some of the route characteristics from the V2X module communication 130. The V2X communication module 130 is configured to communicate with other systems proximate or remotely located from the vehicle 10, for example, to obtain and share information, such as, traffic information, vehicle speed information, construction information, other information, or a combination thereof. The PAC 124 may receive other vehicle speed information, other vehicle location information, other traffic information, information about the propulsion system inverter 106, such as operational parameters, or a combination thereof, from the V2X communication module 130. The operational parameters of the propulsion system inverter 106 may include heat transfer models that include predicted thermal transients, resistive heating as a function of electrical current flow ($I^2R$ losses), thermal properties (e.g., differentials in thermal expansion) of electrical components and connection features (solder, bonds, etc.) and other factors. Other operational parameter information of propulsion system inverter 106 may include propulsion system inverter 106 maintenance and replacements costs, fatigue life reduction, current fuel prices, and other information. Information from the V2X communication module 130 or PAC 124 may be received from the remote computing device 132.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters (such as the operational parameter information of propulsion system inverter 106) from the remote computing device 132, such as, a make and model of the vehicle 10, manufacturer provided energy consumption efficiency of the vehicle 10, a weight of the vehicle 10, other vehicle parameters, or a combination thereof. In some embodiments, the PAC 124 may receive traffic signal location information, traffic stop sign location information, posted speed limit information, lane shift information, other route characteristics or information, or a combination thereof, from the remote computing device 132. In some embodiments, the PAC 124 may receive operational parameter information of propulsion system inverter 106 from the remote computing device 132.

The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the driver of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the driver of the vehicle 10. For example, the driver may interact with an interface of the PAC 124, such as using the display 122 or using a mobile computing device, to provide vehicle parameters of the vehicle 10, such as, vehicle weight, fuel efficiency targets, vehicle make and model, vehicle age, vehicle maintenance information, vehicle identification number, a number of passengers, load information (e.g., an amount of luggage or other load information), other vehicle parameters, or a combination thereof. Additionally, or alternatively, the driver may provide route characteristics, such as a route map, route distance, other route characteristics, or a combination thereof, to the PAC 124. In some embodiments, the PAC 124 learns behavior of the driver of the vehicle 10. For example, the PAC 124 monitors the driver's vehicle speed relative to posted speed limits or whether the driver implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 is configured to control propulsion of the vehicle 10 and thus operational impacts on the propulsion system inverter 106. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the driver of the vehicle 10 with a recommended vehicle speed. In some embodiments, the VPC 102 may include an adaptive cruise control mechanism. For example, the adaptive cruise control mechanism is configured to maintain the desired vehicle speed provided by the driver of the vehicle 10 using the HMI controls 104, and the adaptive cruise control mechanism may be configured to meet fuel consumption targets based on the profile of the energy consumption efficiency. The PAC 124 is configured to determine the profile of the energy consumption efficiency, which may include generating a signal to selectively adjust one or more target vehicle speeds, one or more target torque splits, and one or more route adjustments based on a profile of the energy consumption efficiency for the vehicle 10. The PAC 124 may determine a target torque demand based on profiles of the target vehicle speed, the target torque split, the route characteristics as a function of fuel consumption efficiency, and the target thermal profile.

In some embodiments, the PAC 124 determines the vehicle profile of the energy consumption efficiency using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof. The vehicle profile of the energy consumption efficiency may indicate that the vehicle 10 consumes a specified amount of energy (e.g., within a tolerance range) while operating at a specific vehicle speed (within a tolerance) while traversing routes having particular road, traffic, gradient, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132. In some embodiments, the PAC 124 receives or retrieves standardized fuel consumption data of at least one other vehicle, homologation data, a plurality of standardized fuel consumption data reference points, a parabolic approximation of fuel consumption, a saturation point of energy conservation corresponding to a speed above threshold wherein the fuel efficiency diverges from the parabolic approximation, and a coefficient corresponding to modified energy consumption based on at least one characteristic of a gradient on a segment of the route, or combinations thereof.

In some embodiments, the PAC 124 determines a target thermal profile of the propulsion system inverter 106 using at least some of the information described above. For example, the PAC 124 may determine the target thermal profile using a vehicle weight, manufacturer provided vehicle energy efficiency, historical data corresponding to the propulsion system inverter 106 operating in similar vehicles or similar vehicles while traversing portions of a particular route or specific road grades, or other suitable route or road information, other suitable vehicle parameters, or a combination thereof. The target thermal profile of the propulsion system inverter 106 may indicate that the torque demand requires a specified amount of energy (e.g., within a tolerance range) while operating at a specific vehicle speed (within a tolerance) while traversing routes having particular road, traffic, gradient, and other conditions. For example, the energy requirements may be greater when the vehicle 10 is on an incline and may be less when the vehicle 10 is coasting to a stop. In some embodiments, the PAC 124 receives or retrieves a target thermal profile of the propulsion system inverter 106 for the vehicle 10 determined remotely from the vehicle 10, such as by the remote computing device 132. In some embodiments, the PAC 124 receives standardized propulsion system inverter data, such as operational parameters, a plurality of torque demand levels corresponding to a thermal state status of the propulsion system inverter 106, and a coefficient corresponding to the thermal state status or modified target thermal profile based on at least one characteristic of a gradient on a segment of the route, or combinations thereof.

In some embodiments, the PAC 124 determines a target thermal profile of the propulsion system inverter 106 using at least some of the information described above. For example, the PAC 124 may receive or otherwise identify current fuel prices and inverter damage cost, the inverter damage cost corresponding to at least one of inverter output efficiency degradation, maintenance costs, and replacement costs. In some embodiments, the PAC 124 may generate the target thermal profile corresponding to improving the operational life of the propulsion system inverter 106. In some embodiments, the PAC 124 may generate the target thermal profile as a function of weighing improving the operational life of the propulsion system inverter 106 (e.g., reducing thermal fatigue of at least one component of the propulsion system inverter 106) using associated operational costs of the propulsion system inverter, for example, replacement costs, maintenance costs, energy costs associated with increased torque demand requirements as the efficiency of the propulsion system inverter degrades over time, other suitable costs, or a combination thereof. In some embodiments, the PAC 124 may generate the target thermal profile as a function of the minimum total costs, including inverter damage cost, with appropriate weighting. Units of cost may be generic or specific (such as monetary). In some embodiments, modeled relationships between inverter life and the thermal transients of the critical components are used to establish this damage cost of the proposed operating conditions for a route segment.

In some embodiments the PAC 124 measures output efficiency of the propulsion system inverter 106 as a function of output current resulting from an input from the vehicle operator (e.g., from a gas pedal). Current is delivered through the power electronics components and corresponding electrical connection features (solder, wire bonds, and the like). The power electronic components undergo resistive heating due to associated electrical characteristics coupled with the electrical current flow (e.g., $I^2R$ losses). This heating creates differential thermal expansion within and between the components and connection features, thus creating thermal stress and thermal fatigue.

Inverter life is negatively impacted by the number, rate and severity of the thermal stress cycles. In some embodiments, the PAC 124 determines the propulsion system inverter 106 efficiency as a function of transient driver desired torque inputs and corresponding transient inverter current outputs. In some embodiments, the output efficiency of the propulsion system inverter 106 may include a current output of the propulsion system inverter 106. For example, the current output may include a change in current output under the same or substantially the same input conditions or other suitable current output.

In some embodiments, the PAC 124 may generate an efficiency model corresponding to a propulsion system inverter efficiency from a propulsion system inverter that has not been thermally fatigued and a resulting current output as a function of current input. The PAC 124 may then compare a present current output as a function of current input and compare it to the efficiency model and generate one or more signals to selectively instruct changes in operation based on a threshold divergence of the current efficiency to the efficiently model. In addition or alternatively to monitoring current, a resulting torque demand as a function of vehicle speed input are modeled in a new state and periodically compared to present conditions for monitoring changes in efficiently.

In some embodiments, the PAC 124 may generate the target thermal profile as a function of weighing improving the operational life of the propulsion system inverter 106 against associated impacts to fuel efficiency. In some embodiments, the PAC 124 may generate the target thermal profile as a function of weighing improving the operational life of the propulsion system inverter 106 against associated operator preference for vehicle speed. In some embodiments, the PAC 124 may generate the target thermal profile as a function of weighing improving the operational life of the propulsion system inverter 106 against traffic information, safety information, a characteristic of the route, or combinations thereof. It should be appreciated that in some embodiments, the PAC 124 may generate the target thermal profile as a function of any combination of the factors described herein.

The PAC 124 is configured to use the target thermal profile of the propulsion system inverter and various route characteristics to determine the profiles for the target vehicle speed, target torque split, and the route characteristics for a portion of a route being traversed by the vehicle 10. For example, the PAC 124 may determine that the vehicle 10 is approaching a particular variation in grade over the portion of the route being traversed by the vehicle 10.

The PAC 124 uses the target thermal profile to identify a vehicle speed (within a threshold range of the desired vehicle speed provided by the driver to the VPC 102) and/or a torque split having an optimum energy consumption for the grade variation of the portion of the route being traversed by the vehicle.

In some embodiments, the PAC 124 may determine the vehicle speed and torque split using historical energy consumption for a known route, such as a route previously traversed by the vehicle 10 or similar vehicles. The PAC 124 determines a target torque demand from the identified vehicle speed and determines a target torque split from the identified torque split. It should be understood that the PAC 124 continuously monitors the various characteristics received, as described, and continues to generate the target thermal profile for target vehicle speeds, target torque splits, and the route characteristics as a function of thermal fatigue and other factors, such that, the propulsion system inverter 106 maintains an optimum or improved energy consumption while maintaining driver and/or passenger comfort (e.g., by avoiding sudden, unnecessary changes in vehicle speed).

In some embodiments, the PAC 124 may generate a signal to bypass or detour certain segments of the route. The recommended detour may then be confirmed by the vehicle operator via the HMI controls 104. For example, the PAC 124 may generate a signal that recommends a detour that may add time but reduce negative impacts on the propulsion system inverter 106 and the operator may select whether to follow the recommendation based on personal priorities.

In some embodiments, the PAC 124 may generate a signal that recommends distributing coolant to the propulsion system inverter 106 once a threshold temperature has been reached. In some embodiments, the PAC 124 may generate a signal that recommends distributing coolant to the propulsion system inverter 106 in anticipation of or in reaction to a road or driving characteristic. The characteristics may include changes in road gradient (e.g., an upward incline), stop and go traffic, changes in speed limits, changes in target vehicle speed, changes in the thermal profile, changes in the thermal status, changes in efficiency of the propulsion system inverter 106, or combinations thereof. The coolant may be a distributed liquid, a solid state coolant, a gas, or other suitable coolant.

In some embodiments, the PAC 124 may be configured to determine when the vehicle 10 should coast to achieve optimum or improved thermal fatigue limits of the propulsion system inverter 106. For example, the PAC 124 may use known traffic conditions, for example, to determine when the vehicle 10 should coast. Additionally, or alternatively, the PAC 124 may learn traffic conditions, for example, and may determine whether the vehicle 10 should coast in areas along a route known to typically have traffic based, for example, on time of day. In some embodiments, the PAC 124 may use SPaT information to determine when the vehicle 10 should coast in response to change traffic signals. Additionally, or alternatively, the PAC 124 may determine to increase the target vehicle speed associated with the profile for the target vehicle speed (e.g., within the posted speed limit) in order to increase a likelihood that the vehicle 10 will arrive at a traffic signal while the traffic signal indicates to proceed, which may allow the vehicle 10 to avoid having to stop at traffic signals, based on traffic single timing. In some embodiments, the PAC 124 may determine that a long downward gradient will result in a certain amount of regenerative braking and generate a signal to expend energy from the electric motor before the vehicle reaches the downward gradient. In some embodiments, the PAC 124 may determine that a long downward gradient will result in a certain amount of thermal cooling from a reduction in torque demand and generate a signal to increase the torque demand before the vehicle reaches the downward gradient. In some embodiments, the PAC 124 may determine that a certain amount of regenerative braking torque is needed to maintain the desired thermal profile of the inverter.

In some embodiments, the PAC 124 may be configured to calculate a coast function and/or a road load function (see the Equation (1)) to identify particular vehicle parameters using velocity dependent resistance force. Parameters of the road load function include, vehicle parameters, such as vehicle mass or weight, vehicle rolling friction, vehicle drag coefficient, other vehicle parameters, or a combination thereof, which may be received by the PAC 124, as described. These parameters may then be updated using a coast self-learning function, such that the PAC 124 identifies or requests a coast sequence, (e.g., from historical information and/or from the remote computing device 132) and calculates the coast function result. The PAC 124 may calculate the coast function when requested by the driver of the vehicle 10 who may be prompted to perform a particular learning maneuver by the PAC 124, or may be learned in the background.

Velocity dependent resistive forces: $F$=wind, tires, bearings, and other forces plus acceleration dependent inertial forces plus grade dependent gravitational forces: $F=(A+(B*v)+(C*v^2))+$ ((drive axle %+non-drive axle %)*(Test Mass*acceleration))+(Test Mass*$g$*sin(arc tan (grade %)))     Equation (1)

Where A represents the resistive force that is constant and does not vary with velocity (e.g., bearings, seals, tires, etc.), B represents the resistive force that varies linearly with velocity (e.g., drive train, differential, etc.), and C represents the resistive force that varies with the square of velocity (e.g., aerodynamic drag, tire deformation, etc.)

As described, the PAC 124 may control or interface with the VPC 102 and/or interface with the driver of the vehicle 10 in order to achieve the target speed control input, a torque demand corresponding to the vehicle speed control input, and the portion of the route based on the target thermal profile of the propulsion system inverter 106, which may result in optimum or improved operational life or a reduced operational cost of the propulsion system inverter 106. Additionally, or alternatively, the PAC 124 may control or interface with the VPC 102 in order to bring the vehicle 10 to a complete stop in response to the vehicle 10 approaching a stop sign, traffic signal, traffic, disabled vehicle, or other suitable conditions. The PAC 124 may also control or interface with the VPC 102 in order to resume vehicle propulsion after the vehicle 10 has come to a complete stop.

In some embodiments, the PAC 124 may control with the VPC 102 using virtual inputs in order to achieve the target speed control input, a torque demand corresponding to the vehicle speed control input, and the portion of the route based on the target thermal profile of the propulsion system inverter 106, which may result in optimum or improved operational life or a reduced operational cost of the propulsion system inverter 106. For example, the VPC 102 may receive a desired vehicle speed from the driver of the vehicle 10 using the HMI controls 104. Additionally, or alternatively, the VPC 102 (e.g., when the VPC 102 includes an adaptive cruise control mechanism) may adjust the desired vehicle speed in response to the target thermal profile.

In some embodiments, the PAC 124 generates a signal to instruct the VPC 102 to filter an operator's vehicle speed control input, requested torque demand, and torque split. For example, if the thermal status of the propulsion system inverter 106 reaches a threshold corresponding to failure or a threshold of damage, the PAC 124 may instruct the VPC 102 to reduce the vehicle speed control input (or vehicle speed), the torque demand, and the torque split. In some embodiments, the PAC 124 generates a signal to recommend to the operator to change operational inputs or request.

In some embodiments, the PAC 124 initializes the VPC 102 using the desired speed provided by the driver of the vehicle 10 the first time the driver of the vehicle 10 engages the VPC 102 during a key cycle. The PAC 124 may then provide a signal in the form of the virtual inputs to the VPC 102 in order to control vehicle speed or torque demand to achieve a reduced thermal fatigue of the propulsion system inverter 106. In some embodiments, the PAC 124 may generate a signal in the form of a virtual input that includes a virtual HMI signal that, when received by the VPC 102, may cause the VPC 102 to be enabled, be disabled, and/or to set or adjust the current vehicle speed. The PAC 124 generates the virtual HMI signal based on target vehicle speed profile and/or the target thermal profile. The PAC 124 is in communication with and/or interfaces with the HMI controls 104. The PAC 124 substitutes HMI signals provided by the driver of the vehicle 10 with the virtual HMI signal generated by the PAC 124. The VPC 102, as described, includes a plurality of safety controls. The VPC 102 then applies the target vehicle speed associated with the target vehicle speed profile indicated by the virtual HMI signal, in the same manner the VPC 102 applies a desired vehicle speed provided by the driver using the HMI controls 104, as described. The VPC 102 may determine whether to apply or modify the target vehicle speed and/or the target torque split indicated by the virtual HMI signals based on the safety controls, road conditions, thermal status of the propulsion system inverter 106, or the target thermal profile.

In some embodiments, the PAC 124 generates a virtual input based on the profile of the energy consumption efficiency in order to control the VPC 102 to meet certain fuel consumption targets. The fuel consumption targets may be momentary increases based on current route conditions or an overall consumption target corresponding to an entire route from a starting location to a travel destination. For example, a vehicle 10 may need to go to a charging or fuel station with a limited amount of fuel (e.g., electricity, gasoline, etc.), the PAC 124 may determine a station corresponding to the smallest overall consumption profile based on at least one route characteristic of a portion of a route being traversed by the vehicle. The at least one route characteristic of a portion of a route being traversed by the vehicle may include route length, speed limit, segments of the route with gradients, traffic, the number of stops, and other factors that impact fuel consumption. The PAC 124 may then generate a signal on the most fuel efficient route, torque split, and target speed. The signal may be in the form of a recommendation to a driver, instructions to the adaptive cruise control, instructions for autonomous driving, or a filtering of driver input (for example, by the ADAS Module 128).

In some embodiments, the PAC 124 generates a virtual input based on the target thermal profile in order to control the VPC 102 to meet the target thermal profile. The target thermal profile may be based on time or distance constraints such as momentary based on current route conditions, along segments of the route, or an entire route from a starting location to a travel destination. In events where the thermal fatigue status of the propulsion system inverter 106 reaches a threshold, the target thermal profile may correspond to a route or segments of a route corresponding to the nearest vehicle maintenance station.

The VPC 102 may generate and detect the presence of a virtual lead car and perform operations associated with following a lead car (e.g., maintain a safe distance between the vehicle 10 and the lead car, keeping pace with the lead car, and bringing the vehicle to a stop in response to the lead car being within an object range of the vehicle 10 and coming to a complete stop). The PAC 124 may then control a virtual speed of the virtual lead car based on the target vehicle speed profile and/or the target thermal profile. The VPC 102 may then adjust the current vehicle speed, torque demand, or torque split of the vehicle 10 to follow the virtual lead car. In this manner, the PAC 124 may achieve the target vehicle speed profile of the vehicle 10 to provide optimum or improved energy consumption efficiency of the vehicle 10 and/or a reduction in thermal fatigue of the propulsion system inverter 106. While the PAC 124 is controlling the VPC 102 using the virtual inputs described, the vehicle sensors 108, such as cameras, radar, proximity sensors, and the like, continue to provide information to the VPC 102, such that, while the VPC 102 is applying or following the virtual inputs provided by the PAC 124, the VPC 102 may continue to detect actual vehicles or objects in front of the vehicle 10. The safety controls of the VPC 102 are configured to override the VPC 102, including the virtual inputs provided by the PAC 124, to safely bring the vehicle 10 to a complete stop or increase or decrease vehicle speed in response to the information from the vehicle sensors 108.

In some embodiments, the PAC 124 may be in direct communication with the VPC 102 and the torque split controller 116 to provide recommended target torque demands and target torque splits to the VPC 102 and the torque split controller 116, respectively, to achieve an optimum or improved energy consumption efficiency of the vehicle 10 and/or a reduction in thermal fatigue of the propulsion system inverter 106. For example, the VPC 102 may be configured to receive HMI signals (e.g., as described), to meet a target thermal profile, and to receive a recommended target vehicle speed, torque demand, or torque split signal from the PAC 124. The VPC 102 may determine whether to apply the target vehicle speed indicated by the recommended target vehicle speed signal, for example, based on the driver input, the target thermal profile, and/or the safety controls of the VPC 102.

The torque split controller 116 may be configured to receive a recommended torque split signal from the VPC 102 based on the driver input, as described, and may be configured to receive a recommended target torque split signal from the PAC 124. It should be understood that the PAC 124 may communicate the recommended target torque split signal to the VPC 102, which then may communicate the recommended target torque split signal and/or the recommended torque demand signal (e.g., generated by the VPC 102) to the torque split controller 116. The torque split controller 116 determines whether to apply the target torque split indicated by the recommended target toque split signal based on a comparison to the torque split indicated by the recommended torque split signal provided by the VPC 102 and/or based on an existing propulsion state of the vehicle 10 (e.g., including diagnostic conditions).

In some embodiments, the torque split controller 116 determines whether to apply the target torque split indicated by the recommended target toque split signal based on the target thermal profile, the thermal status of the propulsion system inverter 106, or combinations thereof.

In some embodiments, the PAC 124 may communicate with the display 122 to provide an indicator to the driver that the vehicle speed is changing in order to improve energy consumption efficiency of the vehicle 10. For example, the PAC 124 may use the display 122 to illustrate an energy efficiency symbol that indicates to the driver of the vehicle 10 that the vehicle speed is changing in order to improve energy consumption efficiency of the vehicle 10.

In some embodiments, the PAC 124 may communicate with the display 122 to provide an indicator to the driver that the vehicle speed, torque demand, or torque split is changing in order to reduce thermal fatigue of the propulsion system inverter 106. For example, the PAC 124 may use the display 122 to illustrate an thermal fatigue symbol that indicates to the driver of the vehicle 10 that the vehicle speed, torque demand, or torque split is changing in order to improve energy consumption efficiency of the vehicle 10.

In some embodiments, for example, the VPC 102 may not include an adaptive cruise control system and may include a basic cruise control system. Additionally, or alternatively, the driver of the vehicle 10 may not engage the VPC 102 in order to control propulsion of the vehicle 10 (e.g., the driver of the vehicle 10 may control propulsion manually). Accordingly, the PAC 124 is configured to provide a recommendation to the driver indicating a target vehicle speed of a target vehicle speed profile. The recommendation may be provided to the driver of the vehicle 10 using one or more integrated displays of the vehicle 10, such as the display 122 which may include a portion of a dash or console of the vehicle 10, a navigation display of the vehicle 10, or other suitable integrated displays of the vehicle 10.

In some embodiments, the recommendation may be provided to the driver of the vehicle 10 using a mobile computing device within the vehicle 10. The recommendation may include a symbol or textual information that indicates to the driver of the vehicle 10 to increase or decrease vehicle speed. Additionally, or alternatively, the recommendation may include a coast recommendation that is displayed for a calibratable amount of time and is then withdrawn in response to the driver of the vehicle 10 ignoring the recommendation. The recommendation may include information indicating that the recommendation is in response to a change in speed limit, a stop sign being approached by the vehicle 10, traffic signal timing, target thermal profile, thermal status, energy consumption targets, or other information. The information may be visually displayed and may decay as the vehicle 10 recommendation becomes obsolete.

The driver of the vehicle 10 may determine to honor the recommendation and change the vehicle speed accordingly, or the driver may choose to ignore the recommendation. The PAC 124 may be configured to monitor drive action in response to the recommendation to determine whether the driver of the vehicle 10 honored the recommendation or ignored the recommendation. The PAC 124 may determine whether to adjust recommendations based on the monitored driver action. For example, the PAC 124 may determine not to recommend coasting in response to the driver ignoring a threshold number of coasting recommendations. Additionally, or alternatively, the PAC 124 may determine, using the monitored driver action and the route traversed by the vehicle 10, whether the driver of the vehicle 10 honors the recommendation at certain portions of the route and ignores the recommendations at other portions of the route. The PAC 124 may selectively provide the recommendations to the driver of the vehicle 10 based on the monitored driver action and the vehicle route. Additionally, or alternatively, the PAC 124 may monitor the driver action in response to the recommendation based on traffic patterns, stop signs, traffic signals, target thermal profiles, energy consumption targets and the like. The PAC 124 may selectively determine whether to provide the driver of the vehicle 10 the recommendations based on the monitored driver action in response to traffic patterns, stop signs, traffic signals, energy consumption targets, and the like. In some embodiments, ignored recommendations may be logged and saved. For example, if the driver does not honor recommendations for the target thermal profile, the PAC 124, or another component, may generate a signal to recommend to a service person to inspect the condition of the propulsion system inverter 106.

In some embodiments, the PAC 124 and/or the VPC 102 may perform the methods described herein. However, the methods described herein as performed by the PAC 124 and/or the VPC 102 are not meant to be limiting, and any type of software executed on a controller may perform the methods described herein without departing from the scope of this disclosure. For example, a controller, such as a processor executing software within a computing device onboard the vehicle 10, may perform the methods described herein.

Figure 3:
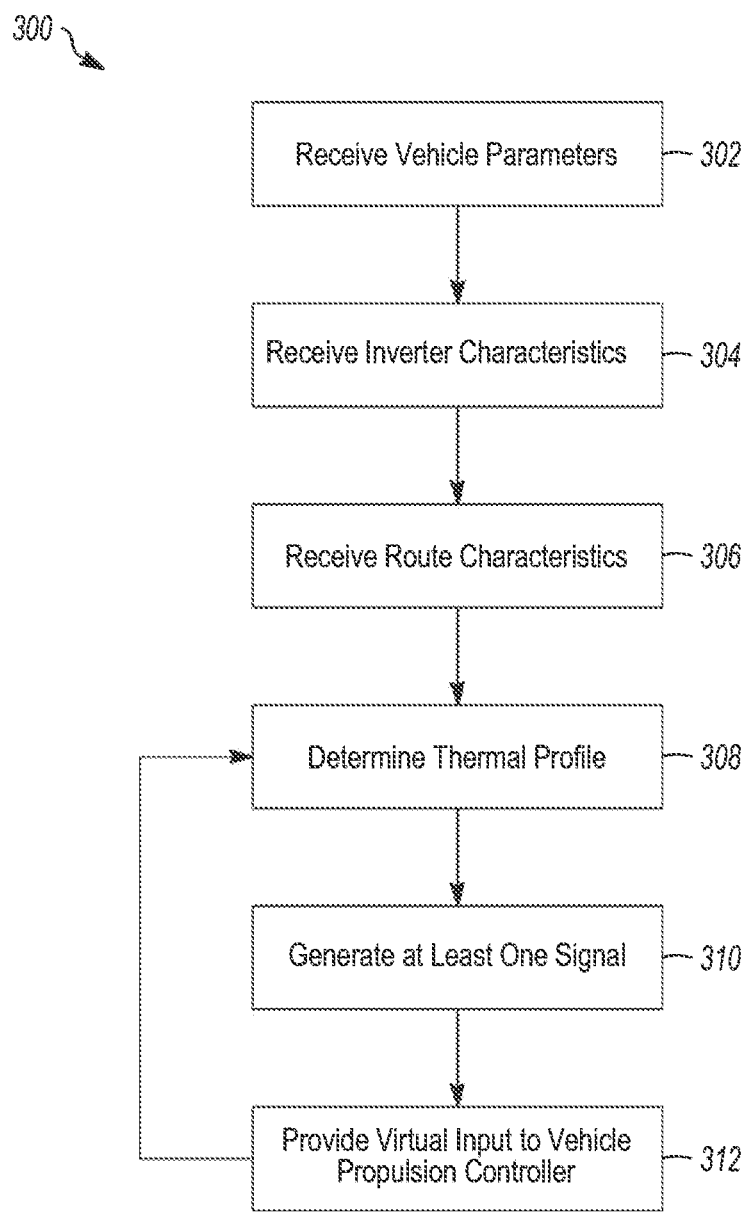
FIG. 3 is a flow diagram generally illustrating a method of controlling a propulsion system inverter according to the principles of the present disclosure.

FIG. 3 is a flow diagram generally illustrating a method 300 of controlling a propulsion system inverter, according to the principles of the present disclosure. At 302, the method 300 receives vehicle parameters. For example, the PAC 124 may receive various vehicle parameters of the vehicle 10 from any of the components described herein.

At 304, the method 300 receives inverter characteristics of the propulsion system inverter corresponding to thermal mass of various inverter components, heat transfer characteristics, inverter power loss characteristics, thermal state of the inverter, and fatigue characteristics, costs, thermal state of the inverter, and combinations thereof. For example, the PAC 124 may receive various inverter characteristics of the propulsion system inverter.

At 306, the method 300 receives route characteristics. For example, the PAC 124 receives various route characteristics (e.g., route characteristics for a route the vehicle 10 is either currently traversing or will traverse) and other information from any other components described herein. For example, the PAC 124 may receive information about varying gradients along segments of the route. In some embodiments, the method continues at 308. In some embodiments, the method continues at 310.

At 308, the method 300 the method 300 determines a target thermal profile of the propulsion system inverter, for example, corresponding to thermal fatigue. For example, the PAC 124 determines the target thermal profile of the propulsion system inverter using the vehicle parameters, associated operations costs, component thermal status, and other route characteristics, such as historical route characteristics associated with routes previously traversed by the vehicle, route characteristics associated with routes previously traversed by similar vehicles having similar propulsion system inverters (e.g., from the remote computing device 132 and/or the V2X communication module 130), other suitable route characteristics, or a combination thereof. In some embodiments, the V2X communication module 130 may receive an output efficiency model of the propulsion system inverter or thermal characteristics (e.g., thermal mass) of the various propulsion system inverter components. In some embodiments, the thermal profile includes determining profiles for the target vehicle speed, the target torque split, and resulting inverter thermal profile as a function of route characteristics, inverter thermal fatigue cost, propulsion system efficiency, fuel consumption efficiency or time efficiency. For example, the PAC 124 determines profiles for a target vehicle speed and/or a target torque split based on the vehicle parameters, the route characteristics, the thermal characteristics of the propulsion system inverter corresponding to thermal fatigue, other information received, as described, from the various components described herein. The profiles of the target vehicle speed and/or target vehicle torque split correspond to a vehicle speed and/or a torque split that, when achieved by the vehicle 10, provide an optimum, or improved inverter thermal fatigue life and energy consumption efficiency of the vehicle 10.

At 310, the method 300 generates at least one signal. For example, the PAC 124 generates the at least one signal. The signal may include a HMI signal and/or a recommendation for reduced thermal fatigue of the propulsion system inverter. The signal, when applied by the VPC 102, may modify the target vehicle speed, the target torque split, and route characteristics. For example, the PAC 124 may generate a recommendation to detour certain segments of a route. In some embodiments, the recommendation is provided to the operator. In some embodiments, the recommendation is an instruction received by VPC 102 to perform autonomously.

At 312, the method 300 provides the signal to the vehicle propulsion controller. For example, the PAC 124 may substitute HMI signals communicated from the HMI controls 104 based on input from the driver of the vehicle 10 with the virtual HMI signals. Additionally, or alternatively, the PAC 124 may substitute vehicle sensor information provided by the vehicle sensors 108 to indicate the virtual lead vehicle to the VPC 102. For example, the VPC 102 may apply the virtual HMI signals and/or may follow the virtual lead vehicle in order to achieve the target vehicle speed and/or torque split. For example, the PAC 124 may continuously update the target vehicle speed and/or target torque split as the vehicle 10 continues to traverse the route and based on updated traffic information, a thermal status of the propulsion system inverter, operational costs, vehicle information, route information, other information, or a combination thereof. The signal at 312 may be in result to generating a target thermal profile of the propulsion system inverter corresponding to thermal fatigue and a corresponding inverter current profile.

Figure 4:
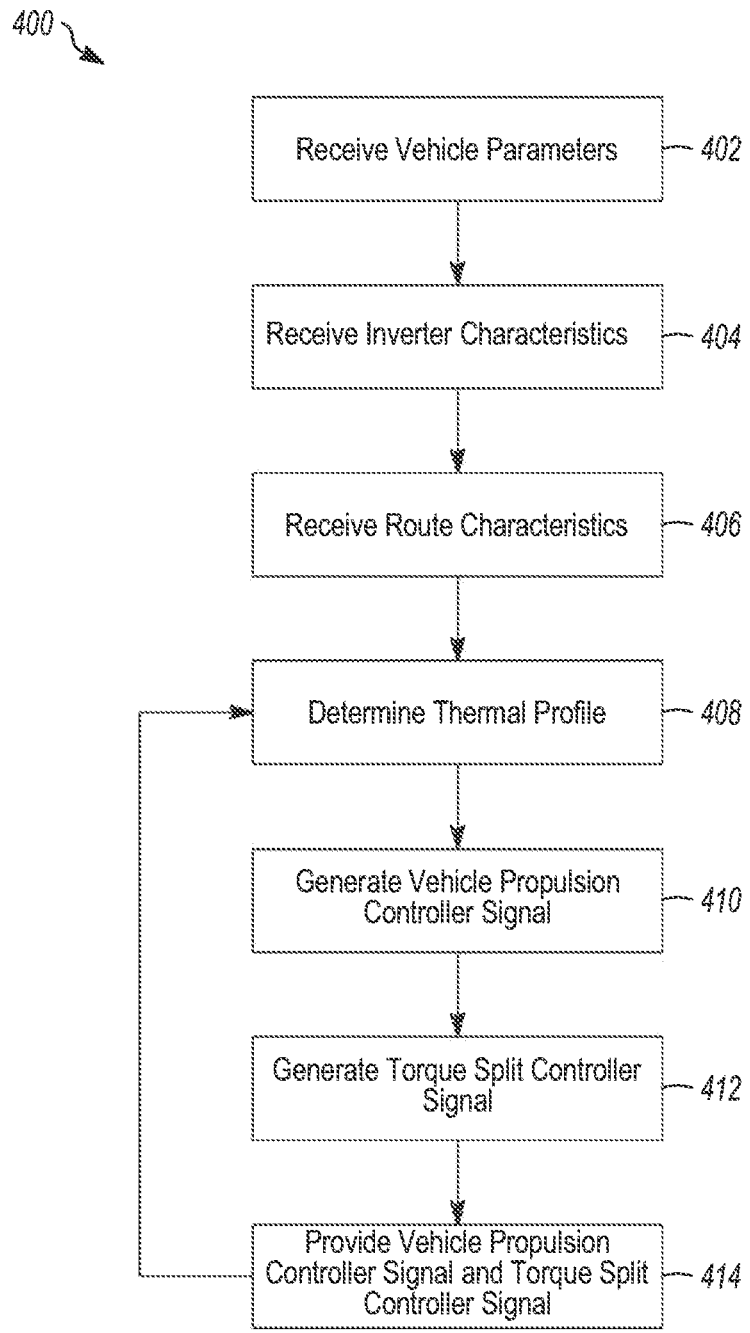
FIG. 4 is a flow diagram generally illustrating an alternative method of controlling a propulsion system inverter according to the principles of the present disclosure.

FIG. 4 is a flow diagram generally illustrating an alternative method 400 of controlling a propulsion system inverter, according to the principles of the present disclosure. At 402, the method 400 receives vehicle parameters. For example, the PAC 124 may receive various vehicle parameters of the vehicle 10 from any of the components described herein.

At 404, the method 400 receives inverter characteristics of the propulsion system inverter corresponding to thermal mass of various inverter components, heat transfer characteristics, inverter power loss characteristics, thermal state of the inverter, and fatigue characteristics, costs, thermal state of the inverter, and combinations thereof. For example, the PAC 124 may receive various inverter characteristics of the propulsion system inverter.

At 406, the method 400 receives route characteristics. For example, the PAC 124 receives various route characteristics (e.g., route characteristics for a route the vehicle 10 is either currently traversing or will traverse) and other information from any other components described herein. For example, the PAC 124 may receive information about segments of the route with varying gradients. In some embodiments, the method continues at 408. In some embodiments, the method continues at 410.

At 408, the method 400 determines a target thermal profile of the propulsion system inverter, for example, corresponding to thermal fatigue. For example, the PAC 124 determines the target thermal profile of the propulsion system inverter using the vehicle parameters, associated operations costs, component thermal status, and other route characteristics, such as historical route characteristics associated with routes previously traversed by the vehicle, route characteristics associated with routes previously traversed by similar vehicles having similar propulsion system inverters (e.g., from the remote computing device 132 and/or the V2X communication module 130), other suitable route characteristics, or a combination thereof. In some embodiments, the V2X communication module 130 may receive an output efficiency model of the propulsion system inverter or thermal characteristics (e.g., thermal mass) of the various propulsion system inverter components. In some embodiments, the thermal profile includes determining profiles for the target vehicle speed, the target torque split, and resulting inverter thermal profile as a function of route characteristics, inverter thermal fatigue cost, propulsion system efficiency, fuel consumption efficiency or time efficiency. For example, the PAC 124 determines profiles for a target vehicle speed and/or a target torque split based on the vehicle parameters, the route characteristics, the thermal characteristics of the propulsion system inverter corresponding to thermal fatigue, other information received, as described, from the various components described herein. The profiles of the target vehicle speed and/or target vehicle torque split correspond to a vehicle speed and/or a torque split that, when achieved by the vehicle 10, provide an optimum, or improved inverter thermal fatigue life and energy consumption efficiency of the vehicle 10.

At 410, the method 400 generates a vehicle propulsion controller signal. For example, the PAC 124 is in direct communication with the VPC 102 and may provide signals as an input to the VPC 102. The PAC 124 generates the vehicle propulsion controller signal based on the target vehicle speed. The vehicle propulsion controller signal may be referred to as a recommended target vehicle speed.

At 412, the method 400 generates a torque split controller signal. For example, the PAC 124 may be in direct communication with the torque split controller 116 and may provide signals as inputs to the torque split controller 116. The PAC 124 generates the torque split controller signal based on the target torque split. The torque split controller signal may be referred to as a recommended target torque split. At 414, the method 400 provides the vehicle propulsion controller signal and the torque split controller signal. For example, the PAC 124 may provide the vehicle propulsion controller signal to the VPC 102. The VPC 102 may determine whether to apply the target vehicle speed indicated by the vehicle propulsion controller signal, as described. The PAC 124 may provide the torque split controller signal to the torque split controller 116 or may provide the torque split controller signal to the VPC 102, which then may provide the torque split signal to the torque split controller 116. The torque split controller 116 may then determine whether to apply the torque split indicated by the torque split controller signal, as described. The vehicle propulsion controller signal and torque split controller signal correspond to a vehicle speed and/or a torque split that, when achieved by the vehicle 10, provide a reduction in thermal fatigue or operating costs to the propulsion system inverter. For example, the PAC 124 may continuously update the target vehicle speed and/or target torque split as the vehicle 10 continues to traverse the route and based on updated traffic information, a thermal status of the propulsion system inverter, operational costs, vehicle information, route information, other information, or a combination thereof. The signal at 412 may be in result to generating a target thermal profile of the propulsion system inverter corresponding to thermal fatigue.

Figure 5:
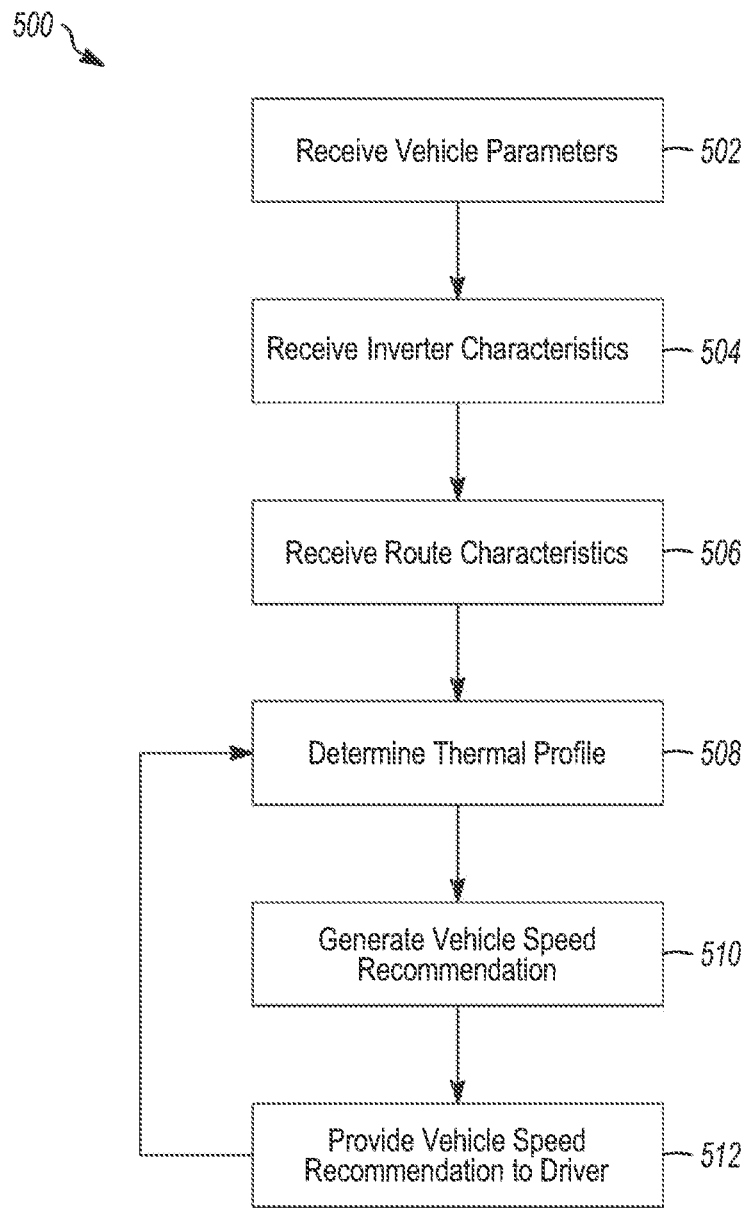
FIG. 5 is a flow diagram generally illustrating an alternative method of controlling a propulsion system inverter according to the principles of the present disclosure.

FIG. 5 is a flow diagram generally illustrating an alternative method 500 of controlling a propulsion system inverter, according to the principles of the present disclosure. At 502, the method 500 receives vehicle parameters. For example, the PAC 124 may receive various vehicle parameters of the vehicle 10 from any of the components described herein.

At 504, the method 500 receives inverter characteristics of the propulsion system inverter corresponding to thermal mass of various inverter components, heat transfer characteristics, inverter power loss characteristics, thermal state of the inverter, and fatigue characteristics, costs, thermal state of the inverter, and combinations thereof. For example, the PAC 124 may receive various inverter characteristics of the propulsion system inverter.

At 506, the method 500 receives route characteristics. For example, the PAC 124 receives various route characteristics (e.g., route characteristics for a route the vehicle 10 is either currently traversing or will traverse) and other information from any other components described herein. In some embodiments, the route characteristics include segments having varying gradients. In some embodiments, the method continues at 508. In some embodiments, the method continues at 510.

At 508, the method 500 determines a target thermal profile of the propulsion system inverter, for example, corresponding to thermal fatigue. For example, the PAC 124 determines the target thermal profile of the propulsion system inverter using the vehicle parameters, associated operations costs, component thermal status, and other route characteristics, such as historical route characteristics associated with routes previously traversed by the vehicle, route characteristics associated with routes previously traversed by similar vehicles having similar propulsion system inverters (e.g., from the remote computing device 132 and/or the V2X communication module 130), other suitable route characteristics, or a combination thereof. In some embodiments, the V2X communication module 130 may receive an output efficiency model of the propulsion system inverter or thermal characteristics (e.g., thermal mass) of the various propulsion system inverter components. In some embodiments, the thermal profile includes determining profiles for the target vehicle speed, the target torque split, and resulting inverter thermal profile as a function of route characteristics, inverter thermal fatigue cost, propulsion system efficiency, fuel consumption efficiency or time efficiency. For example, the PAC 124 determines profiles for a target vehicle speed and/or a target torque split based on the vehicle parameters, the route characteristics, the thermal characteristics of the propulsion system inverter corresponding to thermal fatigue, other information received, as described, from the various components described herein. The profiles of the target vehicle speed and/or target vehicle torque split correspond to a vehicle speed and/or a torque split that, when achieved by the vehicle 10, provide an optimum, or improved inverter thermal fatigue life and energy consumption efficiency of the vehicle 10.

At 510, the method 500 generates a signal for a vehicle speed recommendation, which may be obtained by a vehicle speed control input. For example, the PAC 124 generates a vehicle speed recommendation based on the profile of the target vehicle speed as modified by the inverter target thermal profile. At 512, the method 500 provides the vehicle speed recommendation to the driver. For example, the PAC 124 may provide the vehicle speed recommendation to the driver of the vehicle 10 using the display 122, a mobile computing device, or other suitable devices or displays capable of providing the vehicle speed recommendation to the driver of the vehicle 10. For example, the driver of the vehicle 10 may honor the vehicle speed recommendation or ignore the vehicle speed recommendation. The vehicle speed recommendation corresponds to a vehicle speed, when achieved by the vehicle 10, result in a reduced thermal fatigue of the propulsion system inverter or lower operational costs. For example, the PAC 124 may continuously update the profile of the target vehicle speed split as the vehicle 10 continues to traverse the route and based on updated traffic information, vehicle information, route information, other information, or a combination thereof.

Figure 6:
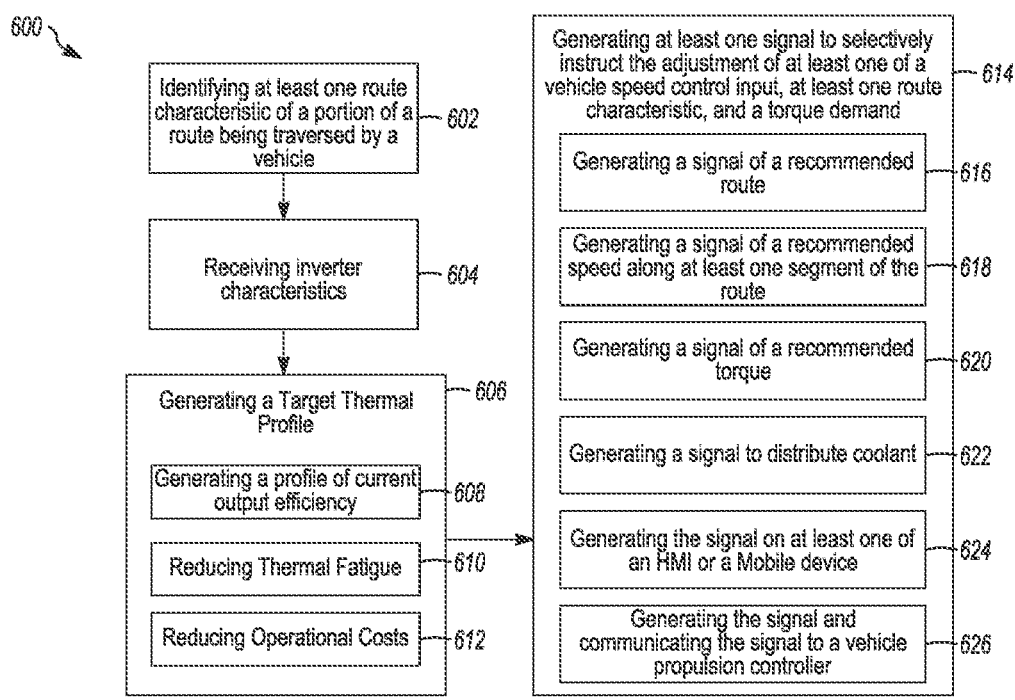
FIG. 6 is a flow diagram generally illustrating an alternative method of controlling a propulsion system inverter according to the principles of the present disclosure.

FIG. 6 is a flow diagram generally illustrating an alternative method 600 of controlling a propulsion system inverter according to the principles of the present disclosure. At 602, the method 600 may identify at least one route characteristic of a portion of a route being traversed by a vehicle. For example, the PAC 124 may receive, from a remotely located computing device, data corresponding to gradients, traffic conditions, and other factors as described. At 604, the method 600 receives inverter characteristics of the propulsion system inverter corresponding to thermal mass of various inverter components, heat transfer characteristics, inverter power loss characteristics, thermal state of the inverter, and fatigue characteristics, costs, thermal state of the inverter, and combinations thereof. For example, the PAC 124 may receive various inverter characteristics of the propulsion system inverter.

At 606, the method 600 includes generating a target thermal profile of the propulsion system inverter. For example, at 608, the method 600 may include generating a profile of current output efficiency of the propulsion system inverter. At 610, the method 600 may include corresponding the target thermal profile to a reduction in thermal fatigue of the propulsion system inverter. At 612, the method 600 may include corresponding the target thermal profile to a reduction in operational costs.

At 614, the method 600 may include generating a signal to selectively instruct the adjustment of at least one of the vehicle speed control input, a torque demand corresponding to the vehicle speed control input, and the portion of the route based on the target thermal profile of the propulsion system inverter. The signal may be generated in the form of a recommendation to an operator and/or instructions to the VPC 102. At 616, the method 600 may include generating signal corresponding to a recommended route. At 618, the method 600 may include generating a signal corresponding to a recommended speed along the at least one segment of a route. For example, at 618, the recommended speed may be achieved via a signal for a torque split controller signal or a torque demand signal. In some embodiments, at 618, the method includes modifying the target vehicle speed profile by adjusting a vehicle speed control input based on the at least one segment of a route with a varying grade. At 620, the method 600 may include generating the signal of a recommended torque, such as a torque demand or a torque split. At 622, the method may include generating a signal to distribute coolant. For example, the PAC may generate a signal in anticipation of or in reaction to a road or driving characteristic. The characteristics may include changes in road gradient (e.g., an incline), stop and go traffic, changes in speed limits, changes in target vehicle speed, changes in inverter current profile, changes in the thermal profile, changes in the thermal status, changes in efficiency of the propulsion system inverter 106, or combinations thereof. The coolant may be a distributed liquid, a solid state coolant, or a gas.

At 624, the method may include generating the signal on at least one of an HMI 104 or mobile device. At 626, the method 600 may include generating the signal and communicating the signal directly to the VPC.

In some embodiments, the method may include generating a target vehicle speed profile for traversing the portion of the route and selectively adjusting a vehicle speed control input based on the target vehicle speed profile.

In some embodiments, a method controlling a propulsion system inverter includes identifying at least one route characteristic of a portion of a route being traversed by a vehicle. The method further includes receiving at least one inverter characteristic. The method further includes generating a target thermal profile of the propulsion system inverter corresponding to thermal fatigue associated the at least one inverter characteristic. The method further includes generating a signal to selectively instruct the adjustment of at least one of the vehicle speed control input, a torque demand corresponding to the vehicle speed control input, and the portion of the route based on the target thermal profile of the propulsion system inverter.

In some embodiments, generating a thermal profile of the propulsion system inverter includes generating a thermal state status of the inverter as a function of thermal mass of the inverter and internal components and heat input based at least partially on at least one of the vehicle speed control input and the torque demand. In some embodiments, generating the thermal state status further includes at least one of measuring and predicting conductive and convective heat transfer coefficients within the inverter based at least partially on at least one of the vehicle speed control input and the torque demand. In some embodiments, generating the thermal state status further includes determining an inverter output efficiency based at least partially on the resulting torque from the torque demand. In some embodiments, the generated signal includes an instruction for at least one of maintenance and inverter replacement once the present inverter remaining life reaches below a threshold limit. In some embodiments, the generated signal includes instructions to adjust the torque demand from a vehicle propulsion controller. In some embodiments, the generated signal includes instructions to adjust the torque demand from a driver desired vehicle speed control input. In some embodiments, the generated signal includes instructions to preemptively control coolant to the propulsion system inverter based on at least one route characteristic of a portion of a route being traversed by the vehicle. In some embodiments, the target thermal profile of the propulsion system inverter is at least partially a function of current fuel prices and inverter damage cost, the inverter damage cost corresponding to at least one of inverter thermal fatigue, output efficiency degradation (e.g., changes in output efficiency), maintenance costs, and replacement costs.

In some embodiments, an apparatus for controlling a propulsion system inverter of a vehicle includes a memory and a processor. The memory includes instructions executable by the processor to: identify at least one route characteristic of a portion of a route being traversed by a vehicle; generate a target vehicle speed profile for traversing the portion of the route; selectively adjusting a vehicle speed control input based on the target vehicle speed profile; generate a target thermal profile of the propulsion system inverter corresponding to thermal fatigue; and generate a signal to selectively instruct the adjustment of at least one of the vehicle speed control input, a torque demand corresponding to the vehicle speed control input, and the portion of the route based on the target thermal profile of the propulsion system inverter.

In some embodiments, generating a thermal profile of the propulsion system inverter includes generating a thermal state status of the inverter as a function of thermal mass of the inverter and internal components and heat input based at least partially on at least one of the vehicle speed control input and the torque demand. In some embodiments, generating the thermal state status further includes at least one of measuring and predicting conductive and convective heat transfer coefficients within the inverter based at least partially on at least one of the vehicle speed control input and the torque demand. In some embodiments, generating the thermal state status further includes determining an inverter output efficiency based at least partially on the resulting torque from the torque demand. In some embodiments, the generated signal includes an instruction for at least one of maintenance and inverter replacement once the present inverter output efficiency or remaining life reaches below a threshold limit. In some embodiments, the generated signal includes instructions to adjust the torque demand from a vehicle propulsion controller. In some embodiments, the generated signal includes instructions to adjust the torque demand from a driver desired vehicle speed control input. In some embodiments, the generated signal includes instructions to preemptively control coolant to the propulsion system inverter based on at least one route characteristic of a portion of a route being traversed by the vehicle. In some embodiments, the target thermal profile of the propulsion system inverter is at least partially a function of current fuel prices and inverter damage cost, the inverter damage cost corresponding to at least one of invertor output efficiency degradation (e.g., changes in output current), maintenance costs, fatigue life reduction, and replacement costs.

In some embodiments, a non-transitory computer-readable storage medium, comprises executable instructions that, when executed by a processor, facilitate performance of operations, comprising: identifying at least one route characteristic of a portion of a route being traversed by a vehicle; receiving at least one inverter characteristic; generating a target thermal profile of the propulsion system inverter corresponding to thermal fatigue associated with the at least one inverter characteristic; and generating a signal to selectively instruct the adjustment of at least one of the vehicle speed control input, a torque demand corresponding to the vehicle speed control input, and the portion of the route based on the target thermal profile of the propulsion system inverter.

In some embodiments, the target thermal profile of the propulsion system inverter is at least partially a function of current fuel prices and inverter damage cost, the inverter damage cost corresponding to at least one of invertor output efficiency degradation, maintenance costs, fatigue life reduction, and replacement costs.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of controlling a propulsion system inverter, the method comprising:
   identifying at least one route characteristic of a portion of a route being traversed by a vehicle;
   receiving at least one inverter characteristic;
   generating a target thermal profile of the propulsion system inverter corresponding to thermal fatigue associated with the at least one route characteristic and the at least one inverter characteristic, wherein generating the target thermal profile includes calculating a damage cost to the propulsion system inverter based on a level and a rate of change of output current of the propulsion system inverter while traversing the portion of the route, wherein the damage cost includes at least a calculation of life reduction of the propulsion system inverter caused by traversing the portion of the route; and
   generating a signal to selectively instruct adjustment of at least one of a vehicle speed control input, a torque demand corresponding to the vehicle speed control input, and the portion of the route based on the target thermal profile of the propulsion system inverter.

2. The method of claim 1, wherein generating the target thermal profile of the propulsion system inverter includes generating a thermal state status of the propulsion system inverter as a function of thermal mass of the propulsion system inverter and internal components and heat input based at least partially on at least one of the vehicle speed control input and the torque demand.

3. The method of claim 2, wherein generating the thermal state status further includes at least one of measuring and predicting conductive and convective heat transfer coefficients within the propulsion system inverter based at least partially on at least one of the vehicle speed control input and the torque demand.

4. The method of claim 2, wherein generating the thermal state status further includes determining an inverter output efficiency based at least partially on resulting torque from the torque demand.

5. The method of claim 4, wherein the generated signal includes an instruction for at least one of maintenance and inverter replacement once a present inverter output efficiency or remaining life reaches below a threshold limit.

6. The method of claim 1, wherein the generated signal includes instructions to adjust the torque demand from a vehicle propulsion controller.

7. The method of claim 1, wherein the generated signal includes instructions to adjust the torque demand from a driver desired vehicle speed control input.

8. The method of claim 1, wherein the generated signal includes instructions to preemptively apply coolant to the propulsion system inverter based on at least one route characteristic of the portion of the route being traversed by the vehicle.

9. The method of claim 1, wherein the damage cost further includes at least one of inverter output efficiency degradation, maintenance costs, and replacement costs.

10. An apparatus for controlling a propulsion system inverter of a vehicle comprising:
    a memory; and
    a processor, wherein the memory includes instructions executable by the processor to:
    identify at least one route characteristic of a portion of a route being traversed by the vehicle;
    receive at least one inverter characteristic;
    generate a target thermal profile of the propulsion system inverter corresponding to thermal fatigue associated with the at least one route characteristic and the at least one inverter characteristic, wherein generating the target thermal profile includes calculating a damage cost to the propulsion system inverter based on a level and a rate of change of output current of the propulsion system inverter while traversing the portion of the route, wherein the damage cost includes at least a calculation of life reduction of the propulsion system inverter caused by traversing the portion of the route; and
    generate a signal to selectively instruct adjustment of at least one of a vehicle speed control input, a torque demand corresponding to the vehicle speed control input, and the portion of the route based on the target thermal profile of the propulsion system inverter.

11. The apparatus of claim 10, wherein generating the target thermal profile of the propulsion system inverter includes generating a thermal state status of the propulsion system inverter as a function of thermal mass of the propulsion system inverter and internal components and heat input based at least partially on at least one of the vehicle speed control input and the torque demand.

12. The apparatus of claim 11, wherein generating the thermal state status further includes at least one of measuring and predicting conductive and convective heat transfer coefficients within the propulsion system inverter based at least partially on at least one of the vehicle speed control input and the torque demand.

13. The apparatus of claim 11, wherein generating the thermal state status further includes determining an inverter output efficiency based at least partially on a resulting torque from the torque demand.

14. The apparatus of claim 13, wherein the generated signal includes an instruction for at least one of maintenance and inverter replacement once a present inverter output efficiency or fatigue life remaining reaches below a threshold limit.

15. The apparatus of claim 10, wherein the generated signal includes instructions to adjust the torque demand from a vehicle propulsion controller.

16. The apparatus of claim 10, wherein the generated signal includes instructions to adjust the torque demand from a driver desired vehicle speed control input.

17. The apparatus of claim 10, wherein the generated signal includes instructions to preemptively control coolant to the propulsion system inverter based on the at least one route characteristic of the portion of the route being traversed by the vehicle.

18. The apparatus of claim 10, wherein the damage cost further includes at least one of invertor output efficiency degradation, maintenance costs, and replacement costs.

19. A non-transitory computer-readable storage medium, comprising executable instructions that, when executed by a processor, facilitate performance of operations, comprising:
    identifying at least one route characteristic of a portion of a route being traversed by a vehicle;
    receiving at least one inverter characteristic;
    generating a target thermal profile of a propulsion system inverter corresponding to thermal fatigue associated with the at least one route characteristic and the at least one inverter characteristic, wherein generating the target thermal profile includes calculating a damage cost to the propulsion system inverter based on a level and a rate of change of output current of the propulsion system inverter while traversing the portion of the route, wherein the damage cost includes at least a calculation of life reduction of the propulsion system inverter caused by traversing the portion of the route; and
    generating a signal to selectively instruct adjustment of at least one of a vehicle speed control input, a torque demand corresponding to the vehicle speed control input, and the portion of the route based on the target thermal profile of the propulsion system inverter.

20. The non-transitory computer-readable storage medium of claim 19, wherein the damage cost further includes at least one of invertor output efficiency degradation, maintenance costs, and replacement costs.

* * * * *